Aug. 2, 1949.                    C. A. TOBIAS                    2,478,138
                          PARACHUTE RELEASE MECHANISM
Filed March 7, 1947                                         2 Sheets-Sheet 1
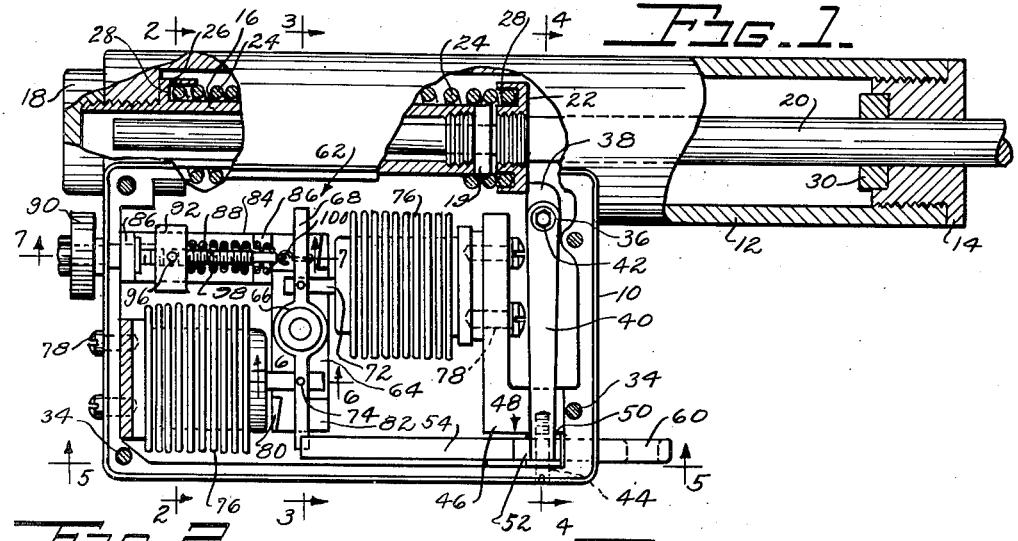
INVENTOR.
CORNELIUS A. TOBIAS
BY Wade Kooritz and
Frederick W. Cotterman
HIS ATTORNEYS Aug. 2, 1949.  C. A. TOBIAS  2,478,138
PARACHUTE RELEASE MECHANISM
Filed March 7, 1947  2 Sheets-Sheet 2
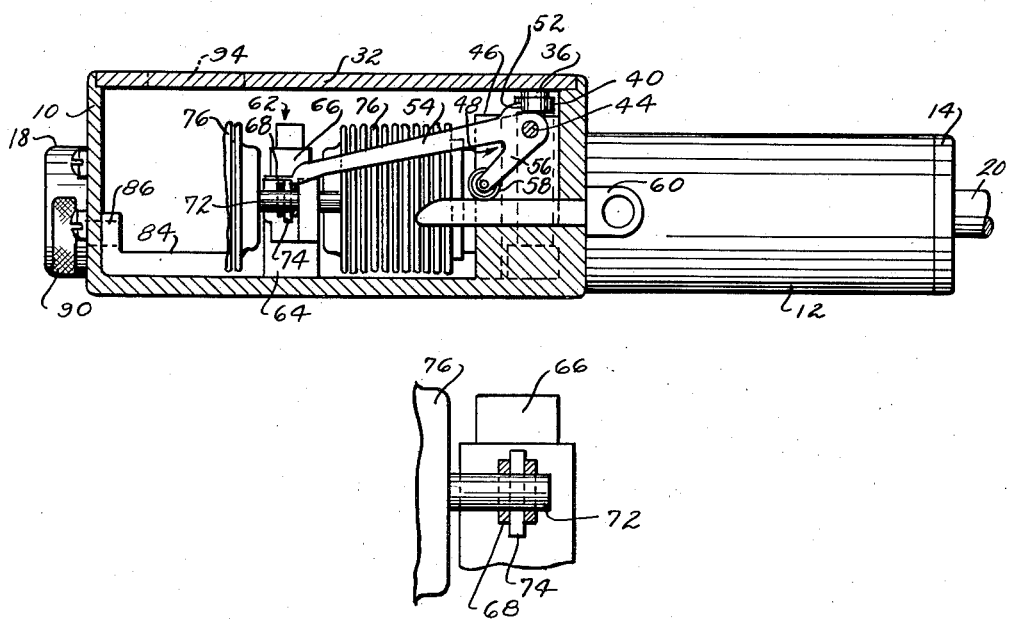
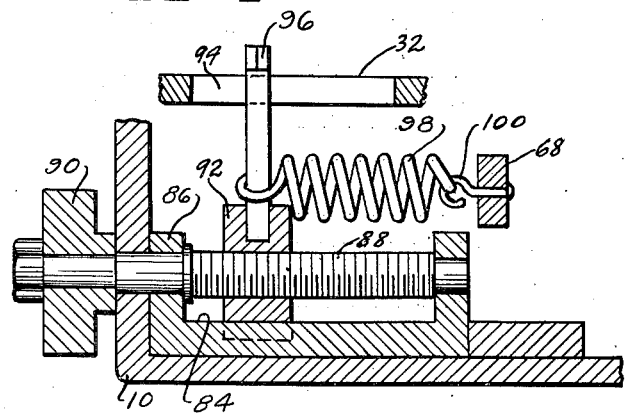
INVENTOR.
CORNELIUS A. TOBIAS
BY Wade Kovity and
Frederick W. Cotterman
HIS ATTORNEYS Patented Aug. 2, 1949

2,478,138

UNITED STATES PATENT OFFICE 2,478,138

PARACHUTE RELEASE MECHANISM

Cornelius A. Tobias, Richmond, Calif., assignor to the United States of America as represented by the Secretary of War Application March 7, 1947, Serial No. 733,147

5 Claims. (Cl. 244—150)

The invention described herein may be manufactured and used by or for the Government for governmental purposes without payment to me of any royalty thereon.

This invention relates to a parachute release mechanism and more particularly to a mechanism for automatically releasing a parachute at a selected altitude.

An object of the invention is to provide a device which may be used in connection with a conventional parachute pack and which includes means to pull the rip cord automatically at a preselected altitude.

Another object is to provide an improved parachute release mechanism which is simple in construction, positive in operation, and inexpensive to build.

More specifically, an object of the invention is to provide a device including a spring or other resilient means in which power may be manually stored, together with a barometric device for releasing said spring and performing work at a preselected atmospheric pressure, and means for preselecting the pressure at which said releasing means will become operative.

Other objects, advantages and meritorious features will become evident as the invention is hereinafter described in detail with reference to the drawings, wherein, Fig. 1 is a top plan view of an embodiment of my invention with the housing cover removed to show the interior construction, a small part of the housing being shown in section for clearness.

Figs. 2, 3, and 4 are transverse sections taken at 2—2, 3—3, and 4—4, respectively, of Fig. 1.

Fig. 5 is a longitudinal section taken at 5—5 of Fig. 1.

Figs. 6 and 7 are fragmentary longitudinal sections taken respectively at 6—6 and 7—7 of Fig. 1.

Like reference characters refer to like parts throughout the several views.

In the drawing, a housing 10 at one end has an elongated hub 12 integral, the outer end of said hub being provided with a threaded plug 14. A tube 16 is threaded into the opposite end of the housing and is coaxial with the hub 12. An internally threaded cap 18 closes the left end of the tube 16 and serves also as a jamb nut. The right end of the tube 16 is provided with a threaded plug 18. An operating rod 20 at its mid portion is slidable in the plug 18 and at its right end its slidable in the plug 14.

An internally threaded collar 22 is threaded onto the operating rod 20. An extension spring 24 is interposed between the collar 22 and an integral collar 26 formed on the tube 16. Grooves 28 are provided in the collars 22 and 26 to maintain the spring in concentric relation with the operating rod 20. A leather bumper 30 is seated in the inner end of the plug 14 against which the collar 22 may stop to limit expansion of the spring 24 and minimise the shock. The housing 10 has a lid 32 secured in place by screws 34.

A rocker shaft 36 has rotative bearing at the top and bottom in the lid 32 and housing 10, respectively. Shaft 36 near the lower end carries a dog 38 which, in the set condition of the device, is interposed in the path of the collar 22 which is being urged axially rightwise by expansion of the spring 24.

Near the upper end of rocker shaft 36 and preferably integral therewith, a latching arm 40 extends forwardly. A hexagonal opening 42 in the upper end of the rocker shaft 36 is provided for a wrench whereby the shaft may be rocked by means of a standard hexagonal wrench when the lid 32 is on the housing 10, thereby moving the latching arm 40 into latching position.

A short trigger shaft 44 has support at one end in the wall of the housing 10 and at the other end is threaded into a bracket 46 which is carried on the inner wall of the housing. A trigger 48 is freely rockable on the shaft 44. Washers 50 hold the trigger 48 spaced apart from the housing 10 and from the bracket 46.

Trigger 48 has a lug 52, a long arm 54 and a short arm 56 carrying a roller 58 at its free end. In the set condition of the device, the lug 52 engages the free end of the latching arm 40. The lug 52 may be held in the latched position shown either by insertion of a key 60 through an opening in the housing 10 thereby to hold the roller 58 against downward movement, or it may be held in the latched position shown by cooperation of the free end of the long trigger arm 54 with a barometric device 62 now to be described.

In the barometric device 62 a supporting bracket 64 is secured to the bottom of the housing. Bracket 64 has an upwardly extending stud portion 66 upon which an unlatching bar 68 is centrally pivoted. Unlatching bar 68 is provided with oblong slots 70 within which the operating rods 72 are pivoted by pins 74. Sealed bellows 76 have their movable ends secured to the ends of the operating rods 72, the stationary ends of the bellows being fastened by screws 78, one to the bracket 46 and the other to the end wall of the housing 10. Obviously, contraction of the bellows 76 will turn the unlatching bar 68 clockwise on the stud portion 66, and expansion of the bellows will turn the bar anticlockwise. Lugs 80 and 82 extending upwardly from the bracket 64 limit clockwise and anticlockwise rotation, respectively, of the unlatching bar 68. In the set condition in which the device is shown, the free end of the long arm 54 lies upon the forward end of the unlatching bar 68. Obviously, if the unlatching bar 68, by reason of bellows contraction, turns clockwise, the forward end of the trip bar 68 will rock out from under the free end of the long arm 54, whereby, if the key 60 is not at that time inserted as shown, the spring 24 acting against the dog 38 will rotate the latching arm 40 clockwise (see Fig. 1), whereby the free end of the latching arm 40, acting against the lug 52 will rotate the trigger 48 anticlockwise (see Fig. 5), thereby causing the long arm 54 to swing downward and withdraw the lug 52 from in front of the end of the latching arm 40, which will allow the latching arm 40 to swing clockwise (see Fig. 1) and remove the dog 38 from in front of the collar 22 which will allow the spring 24 to expand farther until the collar 22 strikes the bumper 30 and thereby provides the necessary movement for pulling a parachute rip cord.

As a means of selectively predetermining the barometric pressure and consequently the approximate altitude at which the bellows 76 will automatically trip the device, there is provided an adjusting means for selectively varying the resistance of the bellows to contraction. A bracket 84 is fast in the bottom of the housing 10 and has upwardly extending ends 86 which are bored to provide rotative bearing for the adjusting screw 88. An adjusting knob 90 outside the housing is fast on the end of the adjusting screw. A nut 92 within the housing is adapted to move longitudinally of the screw upon rotation of the knob 90.

Extending upwardly from the top of the nut 92 and through a slot 94 in the cover 32 is an indicating pointer 96 which, by means of the knob 90, may be brought into registry with a scale which appears along the forward side of the slot, the scale being graduated in terms of altitude. An extension spring 98 has one end hooked over the pointer 96 and the other end secured by a hook 100 to the rearward end of the unlatching bar 68.

The operation of the device is substantially as follows:

Preferably before he goes aloft, the flyer pushes the operating rod 20 to the left substantially as far as it will go. While holding the operating rod 20 in the left position, he inserts a hexagonal wrench into the opening 42 and turns the rocker shaft 36 with its latching arm 40 anticlockwise as far as it will go. While still holding the latching arm 40 in this anticlockwise position he inserts the key 60, which will act on the underside of the roller 58 and thereby present the lug 52 to the outer end of the latching arm 40, thereby holding the dog 38 against the collar 22 to maintain the spring 24 under compression. He may now release and remove the hexagonal wrench from the opening 42.

The selector knob 90 may now be set at the altitude at which the device is to operate automatically to open a parachute, or, if he so desires, the flyer may wait to decide the altitude and adjust the knob until he is ready to bail out. It is noted, however, that as long as he is at less altitude than that at which the pointer 96 indicates, the unlatching bar 68 will be located clockwise from the position shown, i. e., the forward end of the unlatching bar will be out from under the free end of the arm 54. Under these conditions, the barometric device will not be effective to maintain the set condition. At any altitude, therefore, below that which the pointer 96 indicates, the set condition may be maintained only by the inserted key 60.

When, however, the device, thus set and thus held in the set condition by the key 60, is taken aloft, the gradually decreasing pressure on the outside of the bellows 76 causes them to expand until the forward end of the unlatching bar 68 is inserted under the free end of the long arm 54. At or above the altitude at which the pointer 96 is set, the device will remain in the locked condition even if the key 60 is removed.

When the flyer is ready to bail out, he removes the key 60 if he has not already done so. As he descends, the gradually increasing pressure on the outside of the bellows 76 causes the bellows to contract and turn the unlatching bar 68 clockwise about the stud 66 until the forward end of the unlatching bar 68 moves out from under the free end of the long arm 54, whereupon the arm 54 drops and thereby removes the lug 52 away from the free end of the latching arm 40, allowing the latching arm 40 to swing to a position which removes the dog 38 from the collar 22 thus allowing the spring 24 to expand and pull the rip cord of a parachute to which the device is applied.

Having described an embodiment of my invention, I claim:

1. In a parachute release mechanism, the combination of a housing, an operating rod slidable axially in said housing to a set or to a released position, a spring adapted to be stressed by movement of said operating rod to the set position and released for moving said operating rod to the released position, a rocker shaft rotatably supported in said housing, a dog on said rocker shaft adapted by rocking said shaft to hold said operating rod in the set position, a latching arm on said rocker shaft, a trigger shaft supported in said housing, a trigger rockable on said trigger shaft, said trigger having a lug adapted to engage the free end of said latching arm to prevent rocking of said rocker shaft thereby to retain said dog in the set position, a sealed bellows having one end attached to said housing and the other end movable by expansion or contraction of said bellows due to a change in atmospheric pressure, an unlatching bar rockably supported in said housing and having a free end attached to the movable end of said bellows, and a trigger arm on said trigger adapted to rest on the swingable end of said unlatching bar when said bellows is in the expanded condition whereby said lug is held against the swingable end of said latching arm to hold said spring in the set condition.

2. The device defined in claim 1 with a second spring arranged for urging said multiple diaphragm to the expanded state, means for varying the stress of the second spring and indicia externally of the housing for indicating the stress of said second spring in terms of altitude.

3. The device defined in claim 1 with a key means constructed and arranged to be manually inserted into the housing for holding said trigger arm in the set position independently of the unlatching bar.

4. In a parachute release mechanism, the combination of a housing, an operating rod slidable axially in bearings in said housing to a set or to a released position, a spring adapted to be stressed by movement of said operating rod to the set position and released for moving said operating rod to the released position, a rocker shaft rotatably supported in said housing, a dog on said rocker shaft adapted by rocking said rocker shaft to hold said operating rod in the set position, a latching arm on said rocker shaft, a trigger shaft supported in said housing, a trigger rockable on said rocker shaft, said trigger having a lug adapted to engage the free end of said latching arm to prevent rocking of said rocker shaft thereby to retain said dog in the set position, a sealed bellows having one end attached to said housing and the other end movable by expansion or contraction of said bellows due to a change in atmospheric pressure, an unlatching bar rockably supported in said housing and having a free end attached to the movable end of said bellows, a trigger arm on said trigger adapted to rest on the swingable end of said unlatching bar when said bellows is in the expanded condition, whereby said lug is held against the swingable end of said latching arm to hold said spring in the set condition, a second spring arranged for holding said multiple diaphragm to the expanded state, means for varying the stress of the said second spring, indicia outside the housing for indicating the stress of said second spring in terms of altitude, and a key constructed and arranged to be manually inserted into the housing for holding said trigger arm in the set position independently of the said unlatching bar.

5. In a parachute release mechanism, the combination of a frame, a spring carried on said frame adapted to be put under stress and automatically released to expand and pull a parachute rip cord, a lever of the first order fulcrumed on said frame and having a short and a long arm, the short arm being interposed in the path of the spring to hold it in the compressed state, a second lever of the first order fulcrumed on said frame and having a short and a long arm, the short arm of the second mentioned lever being interposed in the path of the end of the long arm of the first mentioned lever to hold it against movement, a lever of the third order fulcrumed on said frame and having its load end interposed in the path of the end of the long arm of the second mentioned lever, and a sealed bellows having one end fast on said frame and the other end contractible axially by and increase in pressure on its outer surface, and a connecting means joining the said other end of said bellows to a medial point of said lever of the third order.

CORNELIUS A. TOBIAS.

REFERENCES CITED

The following references are of record in the file of this patent:

UNITED STATES PATENTS

| Number | Name | Date |
| --- | --- | --- |
| 2,191,250 | Fischel | Feb. 20, 1940 |
| 2,353,440 | Bresee | July 11, 1944 |

FOREIGN PATENTS

| Number | Country | Date |
| --- | --- | --- |
| 278,695 | Great Britain | Apr. 5, 1928 |